(12) United States Patent
Talur

(10) Patent No.: US 11,089,002 B2
(45) Date of Patent: Aug. 10, 2021

(54) TWO-FACTOR AUTHENTICATION FOR A FILE SYSTEM

(71) Applicant: Red Hat, Inc., Raleigh, NC (US)

(72) Inventor: Raghavendra Talur, Bangaluru (IN)

(73) Assignee: Red Hat, Inc., Raleigh, NC (US)

( * ) Notice: Subject to any disclaimer, the term of this patent is extended or adjusted under 35 U.S.C. 154(b) by 73 days.

(21) Appl. No.: 15/713,329

(22) Filed: Sep. 22, 2017

(65) Prior Publication Data
US 2019/0097987 A1     Mar. 28, 2019

(51) Int. Cl.
*H04L 29/06* (2006.01)

(52) U.S. Cl.
CPC ............ *H04L 63/08* (2013.01); *H04L 63/083* (2013.01); *H04L 63/102* (2013.01); *H04L 2463/082* (2013.01)

(58) Field of Classification Search
CPC ....... G06F 21/40; H04L 63/08; H04L 63/102; H04L 63/083; H04L 2463/082
See application file for complete search history.

(56) References Cited

U.S. PATENT DOCUMENTS

| 7,069,580 | B1 * | 6/2006 | Deitz | G05B 19/0428 713/168 |
|---|---|---|---|---|
| 8,555,362 | B2 | 10/2013 | Venkataramani | |
| 8,776,190 | B1 | 7/2014 | Cavage et al. | |
| 8,782,782 | B1 * | 7/2014 | Dicovitsky | H04L 63/102 706/48 |
| 2003/0154406 | A1 * | 8/2003 | Honarvar | G06Q 10/10 726/10 |
| 2004/0003071 | A1 * | 1/2004 | Mathew | H04L 63/083 709/223 |
| 2004/0243824 | A1 * | 12/2004 | Jones | G06F 21/10 713/166 |
| 2008/0092245 | A1 * | 4/2008 | Alward | G06F 21/316 726/28 |
| 2008/0189285 | A1 * | 8/2008 | Rowley | H04L 63/10 |
| 2009/0089869 | A1 * | 4/2009 | Varghese | G06F 21/31 726/7 |
| 2009/0199264 | A1 * | 8/2009 | Lang | G06F 21/31 726/1 |
| 2010/0115610 | A1 * | 5/2010 | Tredoux | G06F 21/316 726/19 |
| 2011/0016534 | A1 * | 1/2011 | Jakobsson | G06F 21/316 726/28 |
| 2014/0137191 | A1 * | 5/2014 | Goldsmith | H04L 63/08 726/3 |

(Continued)

*Primary Examiner* — Theodore C Parsons
(74) *Attorney, Agent, or Firm* — Lowenstein Sandler LLP

(57) ABSTRACT

A first authentication factor associated with a client system may be received. An input may be received from the client system that corresponds to an operation to be performed on a data object. A processing device may determine whether the operation is one of a set of operations being associated with a second authentication factor. In response to determining that the operation is one of the set of operations being associated with the second authentication factor, the processing device may generate a notification for the second authentication factor. A response including the second authentication factor may be received and the operation may be performed in view of the second authentication factor.

18 Claims, 13 Drawing Sheets

(56) References Cited

U.S. PATENT DOCUMENTS

| | | | |
|---|---|---|---|
| 2014/0208424 A1* | 7/2014 | Hudack | G06F 21/316 726/23 |
| 2014/0337930 A1* | 11/2014 | Hoyos | H04L 63/10 726/4 |
| 2016/0057248 A1* | 2/2016 | Tankha | H04L 67/306 726/6 |
| 2016/0277411 A1* | 9/2016 | Dani | H04L 63/20 |
| 2016/0381080 A1* | 12/2016 | Reddem | H04L 63/0884 726/1 |
| 2017/0034169 A1 | 2/2017 | O'Brien | |
| 2018/0069879 A1* | 3/2018 | Epstein | H04L 63/0861 |

\* cited by examiner

US 11,089,002 B2

TWO-FACTOR AUTHENTICATION FOR A FILE SYSTEM

TECHNICAL FIELD

The present disclosure is generally related to file system management, and is more specifically related to two-factor authentication for a file system.

BACKGROUND

Multi-factor authentication is a method in which a user of a file system is granted permissions after presenting multiple, separate authentication factors. One form of multi-factor authentication is a two-form authentication that may require two separate authentication factors to be received before permissions are granted. Authentication factors may be information used to prove the identity of a user. The authentication factors may be provided by the user separately in a manner that an unauthorized actor would be unlikely to acquire the authentication factors. The user may then be granted permissions.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
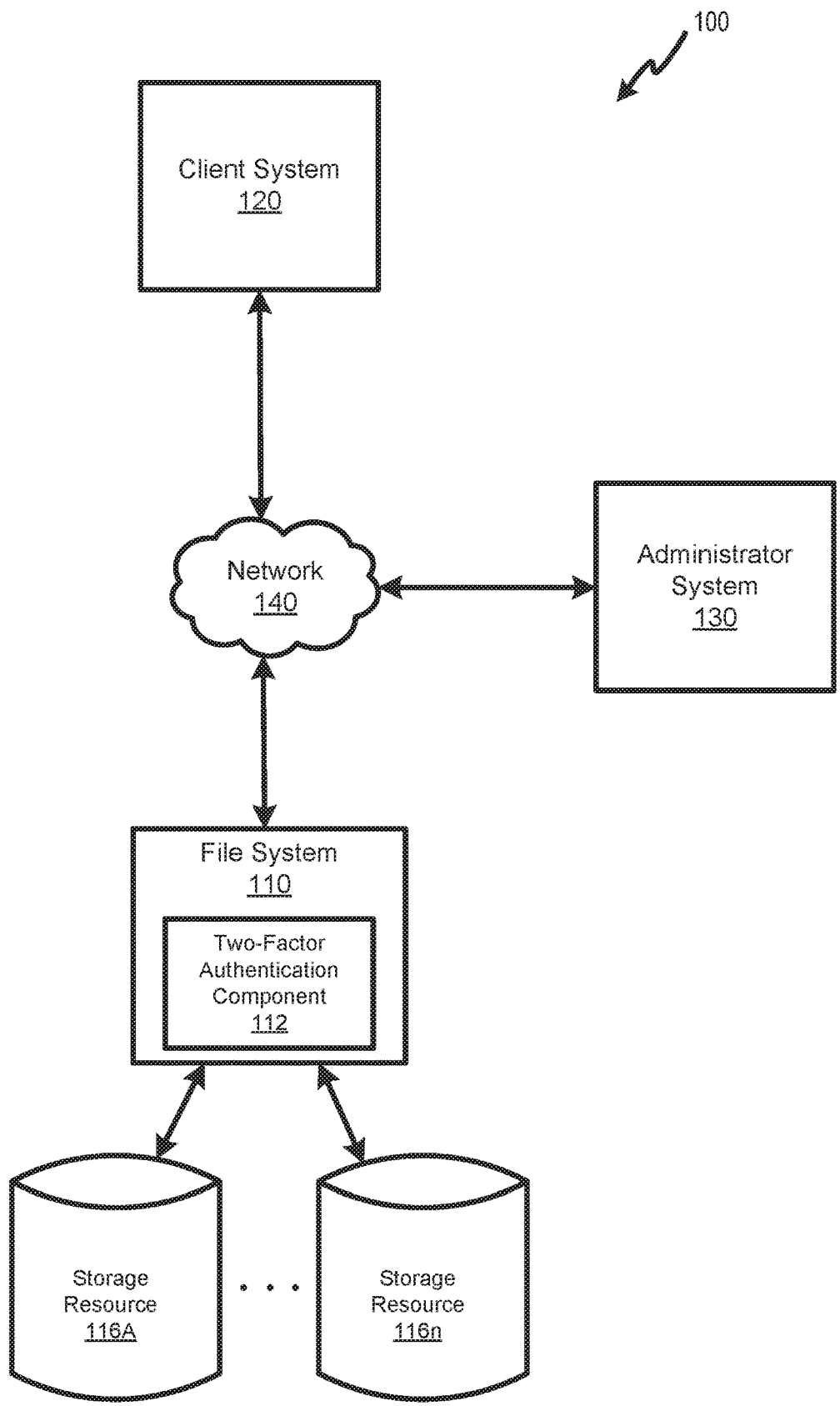
FIG. 1 illustrates an example system architecture in which implementations of the disclosure may operate in accordance with one or more aspects of the present disclosure.

Aspects of the present disclosure relate to two-factor authentication for a file system. A file system may be coupled to one or more storage resources. The storage resources may store one or more data objects. Client systems may access the data objects of the file server via a network to perform various operations on the data objects. An administrator system may manage the configuration and settings of the file server, including permissions granted to clients.

When a client system attempts to access the file system, the client may provide an authentication factor to the file system. For example, the client may provide a username and password as the authentication factor. When the file system receives the authentication factor, permission may be granted to the client system. The client system may then perform operations on the data objects stored on the storage resources of the file system. For example, the client system may provide an input to the file system to instruct the file system to delete or modify a data object. The file system may then perform the operation corresponding to the received input from the client system. The use of the authentication factor may ensure that the client system is authorized to perform the operations on the data objects of the file system. However, if the client system has been compromised with malware, a single authentication factor may not be sufficient to keep the data objects of the file system secure. Malware on the client system may use exploits that allow the malware to perform operations on the data objects using the permissions of an authorized user of the client system. For example, malware on a client system may use the permissions of the authorized user of the client system to delete data objects on the file system.

Accordingly, described herein are aspects of a two-factor authentication for a file system. In an example, the file system may receive a first authentication factor associated with a client system. The file system may receive an input from the client system that corresponds to an operation that is to be performed on a data object stored in a storage resource of the file system. The file system may determine whether the operation is one of a set of operations that are associated with a second authentication factor. In response to determining that the operation is one of the set of operations being associated with the second authentication factor, the file system may generate a notification that includes the second authentication factor. Subsequently, the file system may receive a response that includes the second authentication factor and perform the operation on the data object in view of the second authentication factor.

According to aspects of the disclosure, the file system may receive an indication of a client system that satisfies a first authentication factor. The file system may identify an operation requested by the client system to be performed on a data object of the file system. Then, the file system may determine whether the operation is one of a set of operations being associated with a second authentication factor. In response to determining that the operation is one of the set of operations requiring the second authentication factor, the file system may provide a notification that includes the second authentication factor to an administrator system. Subsequently, the file system may receive a response that includes the second authentication factor from the administrator system. The file system may then determine whether the response was received in view of a timing schedule. In response to determining that the response was received in view of the timing schedule, the file system may perform the operation on the data object.

Thus, the aspects of the present disclosure may be advantageous by keeping data objects in a file system secure from harmful operations performed by malicious programs (e.g., malware) using the permissions of an authorized user of a client system. The file system does this by securing a second authentication factor for certain operations being performed on data objects of the file system. For example, if a client system provides an input to the file system to delete a data object, the file system may secure a second authentication factor prior to deleting the data object to ensure the input did not come from an unauthorized user. By preventing operations from being performed on data objects by malicious programs, the integrity of the data objects of the file system is maintained, improving the performance of the file system.

FIG. 1 illustrates an example system architecture 100 in which implementations of the disclosure may operate. The system architecture 100 may include a file system 110, a client system 120 and an administrator system 130 coupled via a network 140. The network 140 may be a public network (e.g., the Internet), a private network (e.g., a local area network (LAN) or wide area network (WAN)), or a combination thereof. Network 140 may include a wireless infrastructure, which may be provided by one or more wireless communications systems, such as a wireless fidelity (WiFi) hotspot connected with the network 140 and/or a wireless carrier system that can be implemented using various data processing equipment, communication towers, etc. Additionally or alternatively, network 140 may include a wired infrastructure (e.g., Ethernet).

Any number of client systems 120 and administrator systems 130 may access the file system 110. The client system 120 and the administrator system 130 may include one or more processors communicatively coupled to memory devices and input/output (I/O) devices. The client system 120 and administrator system 130 may be a computing device such as a server computer, a desktop computer, a set-top box, a gaming console, a television, a portable computing device such as, and not limited to, mobile telephones, personal digital assistants (PDAs), portable media players, netbooks, laptop computers, an electronic book reader and the like.

The file system 110 may be hosted by a computer system (described in more detail below with reference to FIG. 8) and include one or more computer programs executed by the computer system for centralized management of the system architecture 100. In some implementations, the file system 110 may be a distributed file system that includes multiple computing systems communicatively coupled to one another. The file system 110 includes two-factor authentication functionality that secures a second authentication factor in response to receiving an input corresponding to certain operations associated with a second authentication factor. In one example, file system 110 may include a two-factor authentication component 112 and storage resources 116A-n. Storage resources 116-A-n may store one or more data objects of the file system 110. The file system 110 may perform various operations (e.g., copy, modify, rename, delete, etc.) on the one or more data objects in response to receiving an input that corresponds to a particular operation.

The two-factor authentication component 112 may determine that an input received by the file system 110 corresponds to an operation associated with a second authentication factor. Operations associated with a second authentication factor may be operations that are not performed on data objects of the file system 110 until the second authentication factor has been received. A listing of the operations associated with a second authentication factor may be stored on storage resources 116A-n. The two-factor authentication component 112 may generate a notification that includes the second authentication factor and provide the notification to the client system 120 and/or the administrator system 130. The two-factor authentication component 112 may also receive a response from the client system 120 and/or the administrator system 130 that includes the second authentication factor. For example, if the file system 110 receives an input corresponding to a delete operation to be performed on a data object, the two factor-authentication component 112 may query storage resources 116A-n and determine that the delete operation is an operation associated with a second authentication factor. Then, the two-factor authentication component 112 may generate a notification that includes the second authentication factor and provide the notification to the client system 120 and/or the administrator system 130. Subsequently, the two-factor authentication component 112 may receive a response to the notification from the client system 120 and/or the administrator system 130 that includes the second authentication factor.

Figure 2A:
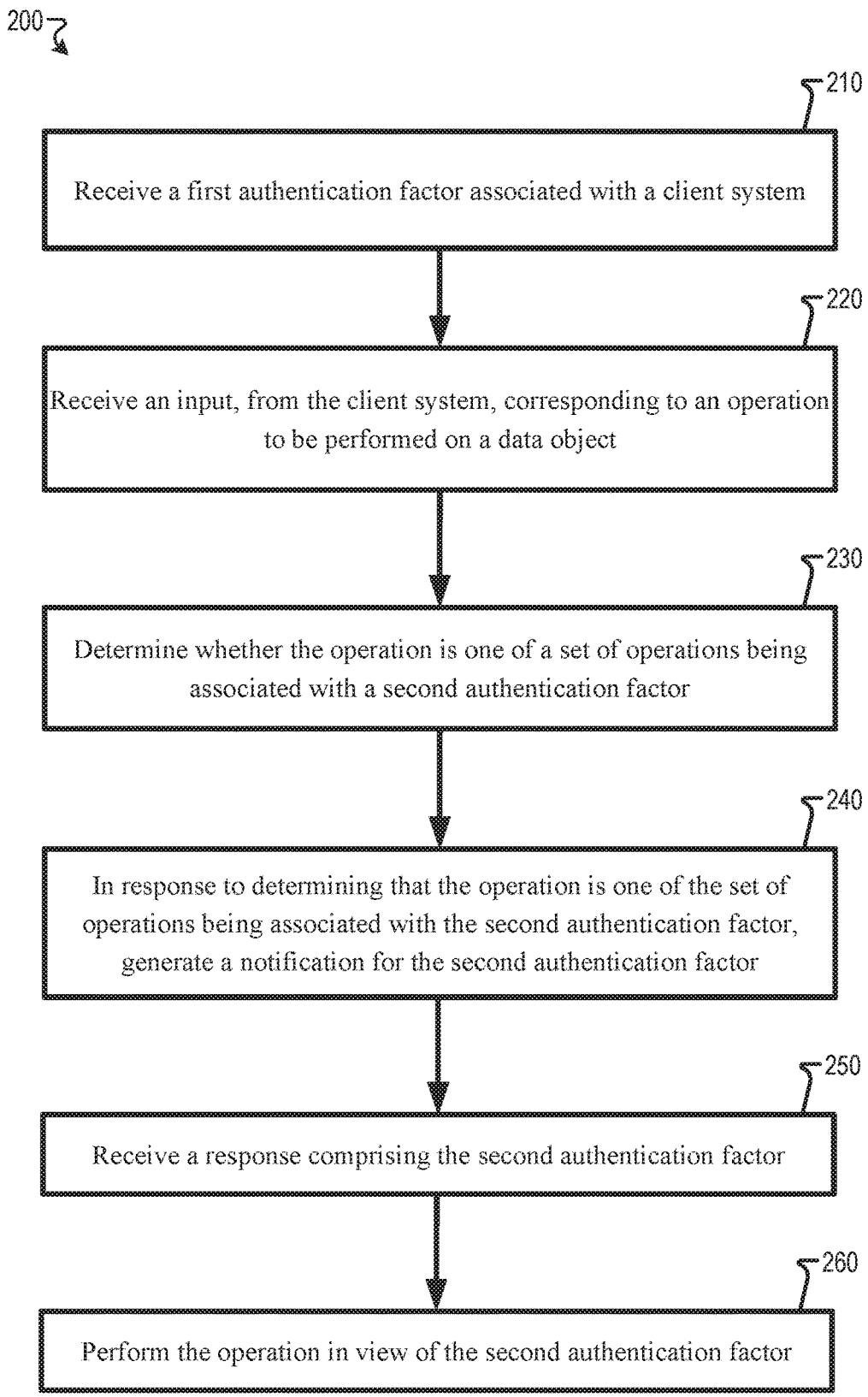
FIG. 2A depicts a flow diagram of an example method to secure a second authentication factor in response to determining an operation is one of a set of operations associated with a second authentication factor in accordance with one or more aspects of the present disclosure.

FIG. 2A depicts a flow diagram of an example method 200 to secure a second authentication factor in response to determining an operation is one of a set of operations associated with a second authentication factor. The method 200 may be performed by a processing device that may include hardware (e.g., processing logic, circuitry, dedicated logic, programmable logic, microcode, etc.), software (e.g., instructions run or executed on a processing device), or a combination thereof. In general, the method 200 may be performed by the two-factor authentication component 112 of FIG. 1.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

Method 200 may begin with a processing device of a file system receiving a first authentication factor that is associated with a client system (block 210). In one implementation, the first authentication factor may correspond to an account authentication of the client system. For example, the first authentication factor may be a username and password for the client system. Upon receiving the first authentication factor, the file system may grant the client system permissions associated with the file system. The processing device may receive an input from the client system that corresponds to an operation to be performed on a data object (block 220). For example, the processing device may receive an input from the client system that corresponds to deleting a data object of the file system.

Subsequently, the processing device may determine whether the operation is one of a set of operations that are associated with a second authentication factor (block 230). For example, the processing device may query a storage resource for a set of operations that are associated with a second authentication factor and determine if the operation of the received input matches one of the set of operations. In an implementation, the set of operations may be identified as any operation that modifies a data object. In one implementation, the set of operations that are associated with a second authentication factor may be designated by an administrator of the file system. For example, an administrator may designate unlink (e.g., delete), truncate and rename operations as being associated with a second authentication factor. Accordingly, the file system will not perform any unlink, truncate or rename operations without securing a second authentication factor. In an implementation, an operation may be considered to be associated with the second authentication factor if the operation is not performed until the second authentication factor is received.

In response to determining that the operation is one of the set of operations being associated with the second authentication factor, the processing device may generate a notification that includes the second authentication factor (block 240). For example, after querying the storage resource for the set of operations associated with a second authentication factor, the processing device may determine that a delete operation is associated with a second authentication factor. Then, the processing device may generate a notification that includes the second authentication factor. In one implementation, the second authentication factor may be a Time-based One-time (TOTP) password that is generated by the processing device in view of a shared key and the time the second authentication factor is generated. In some implementations, the processing device may transmit the notification, where the notification includes a prompt to provide the second authentication factor and an identification of the operation and the data object. For example, the processing device may transmit the notification that includes a selectable icon that, when selected, allows a client system and/or administrator system to provide the second authentication factor. Furthermore, the notification may identify that the operation to be performed is a delete operation and indicate a particular data object the delete operation is to be performed on.

In one implementation, the processing device may determine a computing device associated with an administrator of a file system that includes the data object. The processing device may determine the computing device by querying a directory, such as a Lightweight Directory Access Protocol (LDAP), an Active Directory (AD) or a similar directory, for the computing device associated with an administrator. The processing device may then provide the authentication notification to the computing device associated with the administrator of the file system.

After generating the notification, the processing device may receive a response that includes the second authentication factor (block 250). For example, the processing device may receive a response including the TOTP password that was generated at block 240. Once the second authentication factor has been received, the processing device may perform the operation in view of the second authentication factor (block 260). For example, after receiving the response that includes the second authentication factor, the processing device may delete the data object in view of the received input at block 220.

In some implementations, the processing device may receive a second input from the client system that corresponds to a second operation to be performed on a data object. For example, the file system may receive an input from the client system that corresponds to a copy operation of the data object. The processing device may then determine whether the second operation is one of the set of operations being associated with the second authentication factor, as discussed at block 230. In response to determining that the operation is not one of the set of operations being associated with the second authentication factor, the processing device may perform the second operation without receiving a corresponding authentication factor. For example, the processing device may determine that the copy operation is not an operation that is associated with a second authentication factor. Accordingly, the processing device may perform the copy operation on the data object without receiving a second authentication factor.

Figure 2B:
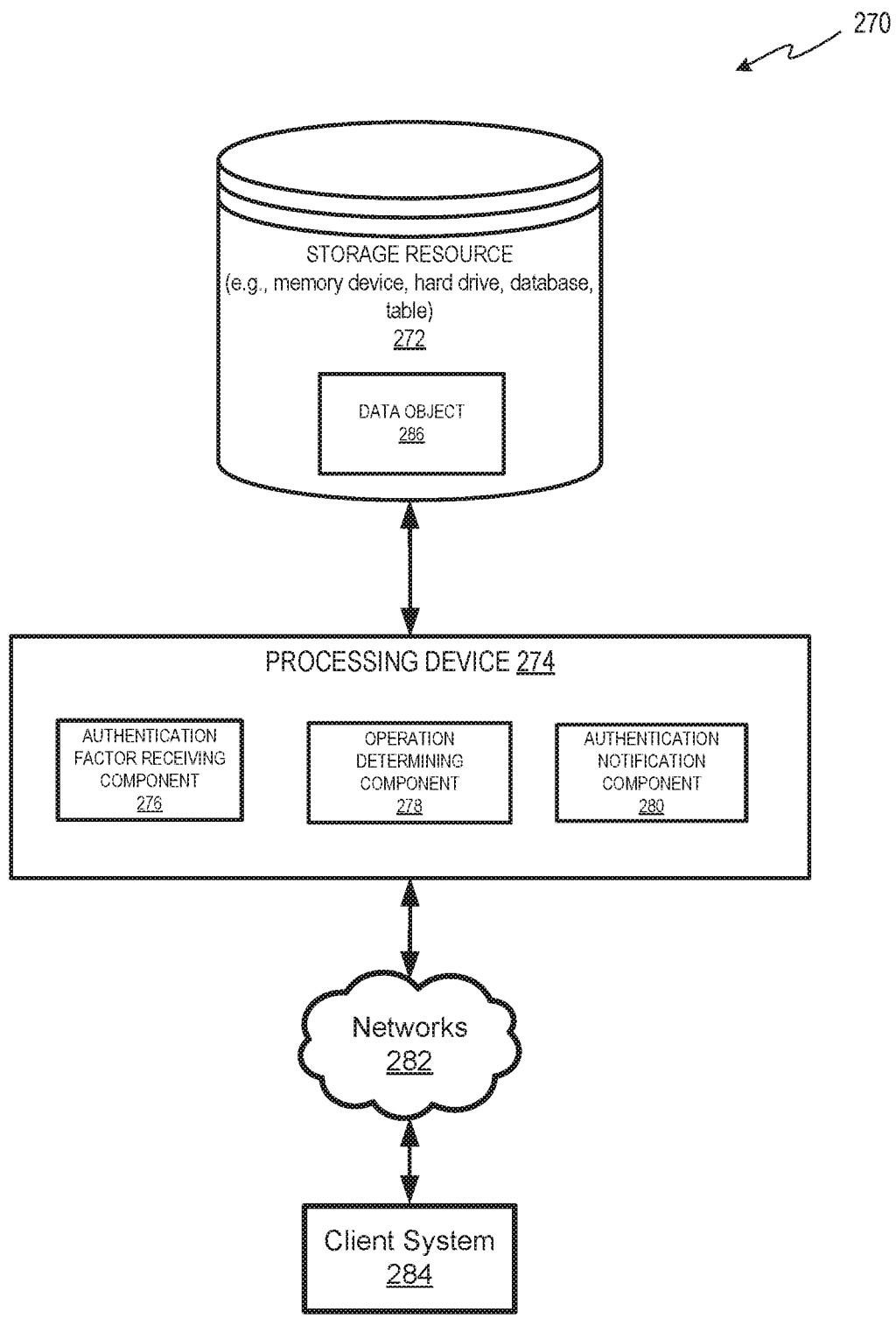
FIG. 2B illustrates an example apparatus in which implementations of the disclosure may operate in accordance with one or more aspects of the present disclosure.

FIG. 2B illustrates an example apparatus 270 in which implementations of the disclosure may operate. The apparatus 270 may be the same or similar to one of the distributed computing system, a network, or other computing devices. The storage resource 272 may include any non-persistent data storage (e.g., memory), persistent data storage (e.g., flash storage, hard drive, tape), another medium, or combination thereof that is capable of storing instructions for carrying out the operations of the components and module discussed herein. Furthermore, the storage resource 272 may store information, such as data object 286). The processing device 274 may be communicatively coupled to a client system 284 via a network 282. The client system 284 and the network 282 may correspond to client system 120 and network 140 of FIG. 1, respectively.

The apparatus 270 may include a processing device 274. The processing device 274 may include an authentication factor receiving component 276, an operation determining component 278, and an authentication notification component 280.

The authentication factor receiving component 276 may receive the first authentication factor from a client system and, in response, grant permissions to the client system. The authentication factor receiving component 276 may also receive the second authentication factor from a client system 284 and/or administrator system. The operation determining component 278 may determine that an operation to be performed on a data object of the file system is an operation associated with a second authentication factor. The authentication notification component 280 may generate a notification for a second authentication factor in response to the operation determining component 278 determining a received input corresponds to an operation that is associated with a second authentication factor. The authentication notification component 280 may also generate the second authentication factor, such as a TOTP password. The authentication notification component 280 may also provide the notification to a client system 284 and/or administrator system.

Figure 3A:
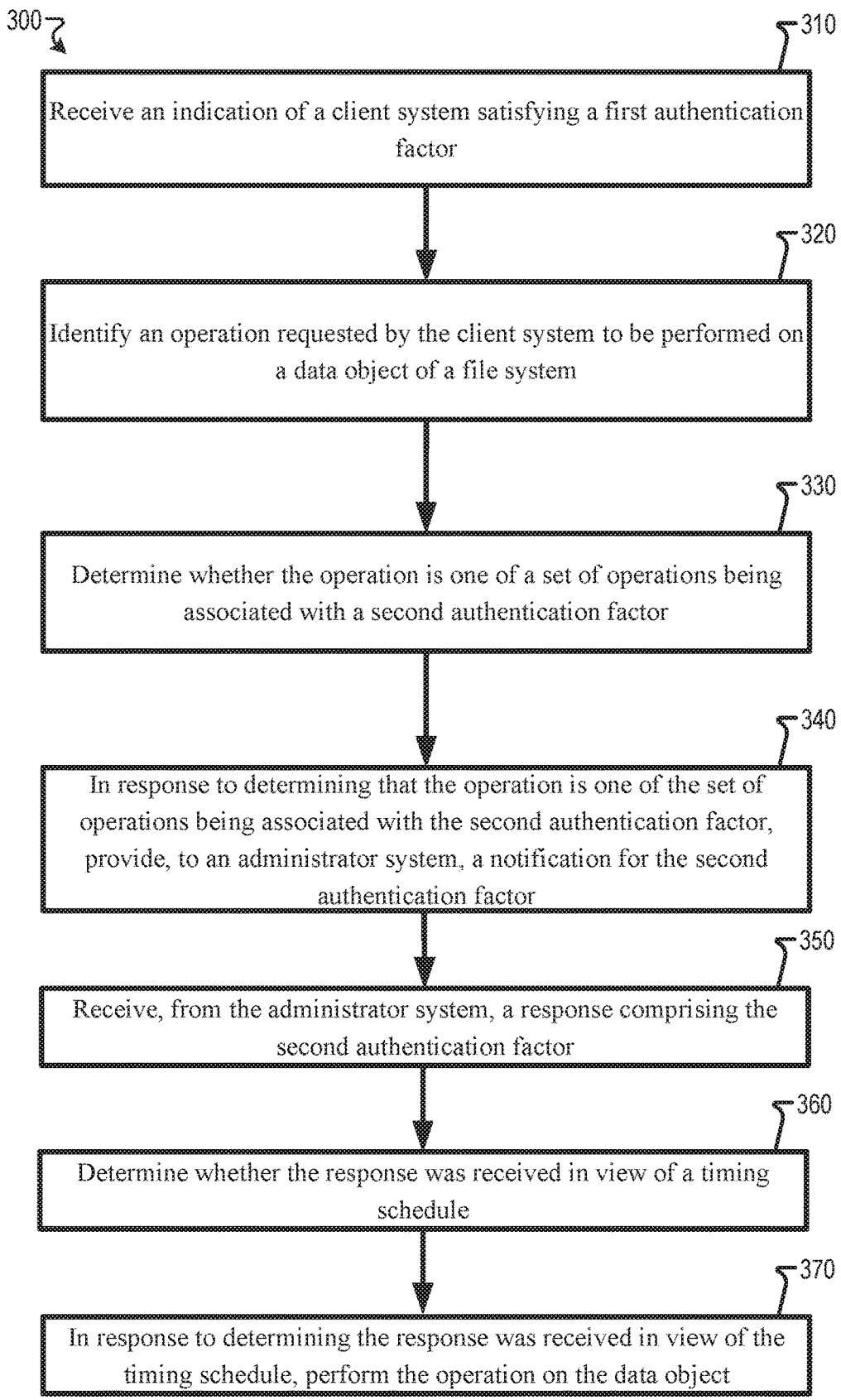
FIG. 3A depicts a flow diagram of an example method to secure a second authentication factor in view of a timing schedule in accordance with one or more aspects of the present disclosure.

FIG. 3A depicts a flow diagram of an example method 300 to secure a second authentication factor in view of a timing schedule. The method 300 may be performed by a processing device that may include hardware (e.g., processing logic, circuitry, dedicated logic, programmable logic, microcode, etc.), software (e.g., instructions run or executed on a processing device), or a combination thereof. In general, the method 300 may be performed by the two-factor authentication component 112 of FIG. 1.

Method 300 may begin with a processing device of a file system receiving an indication of a client system satisfying a first authentication factor (block 310). In one implementation, the first authentication factor may correspond to an account authentication of the client system. For example, the first authentication factor may be a username and password for the client system. Upon receiving the first authentication factor, the file system may grant the client system permissions associated with the file system. After granting access, the processing device may identify an operation requested by the client system to be performed on a data object of a file system (block 320). For example, the processing device may receive an input from the client system and identify that it corresponds to an instruction to delete a data object of the file system.

Subsequently, the processing device may determine whether the operation is one of a set of operations that are associated with a second authentication factor (block 330). For example, the processing device may query a storage resource for a set of operations that are associated with a second authentication factor and determine if the operation of the received input matches one of the set of operations.

In response to determining that the operation is one of the set of operations being associated with the second authentication factor, the processing device may provide a notification to an administrator system that includes the second authentication factor (block 340). For example, after querying the storage resource for the set of operations associated with a second authentication factor, the processing device may determine that a delete operation is associated with a second authentication factor. Then, the processing device may provide a notification that includes the second authentication factor. In one implementation, the second authentication factor may be a TOTP password that is generated by the processing device. In another implementation, the notification may be provided to the client system. In a further implementation, the notification may be provided to a group of client systems and/or administrator systems associated with the data object.

After providing the notification, the processing device may receive a response that includes the second authentication factor (block 350). For example, the processing device may receive a response including the TOTP password that was generated at block 340. Once the second authentication factor has been received, the processing device may determine whether the response was received in view of a timing schedule (block 360). The timing schedule may correspond to an amount of time that may elapse before a timeout of the operation at block 320. For example, if the timing schedule indicates that 5 minutes may elapse before a timeout of the operation, then if the second authentication factor is not received by the processing device within 5 minutes then the operation will timeout (e.g., the operation will not be performed). In some implementations, different operations may have different timing schedules. For example, a delete operation may have a timing schedule that indicates that 5 minutes may elapse before timeout of the operation, while a rename operation may have a timing schedule that indicates that 10 minutes may elapse before timeout of the operation. In response to determining the response was received in view of the timing schedule, the processing device may perform the operation on the data object (block 370). For example, after determining the response was received before 5 minutes has elapsed, the processing device may delete the data object in view of the identified operation at block 320.

Figure 3B:
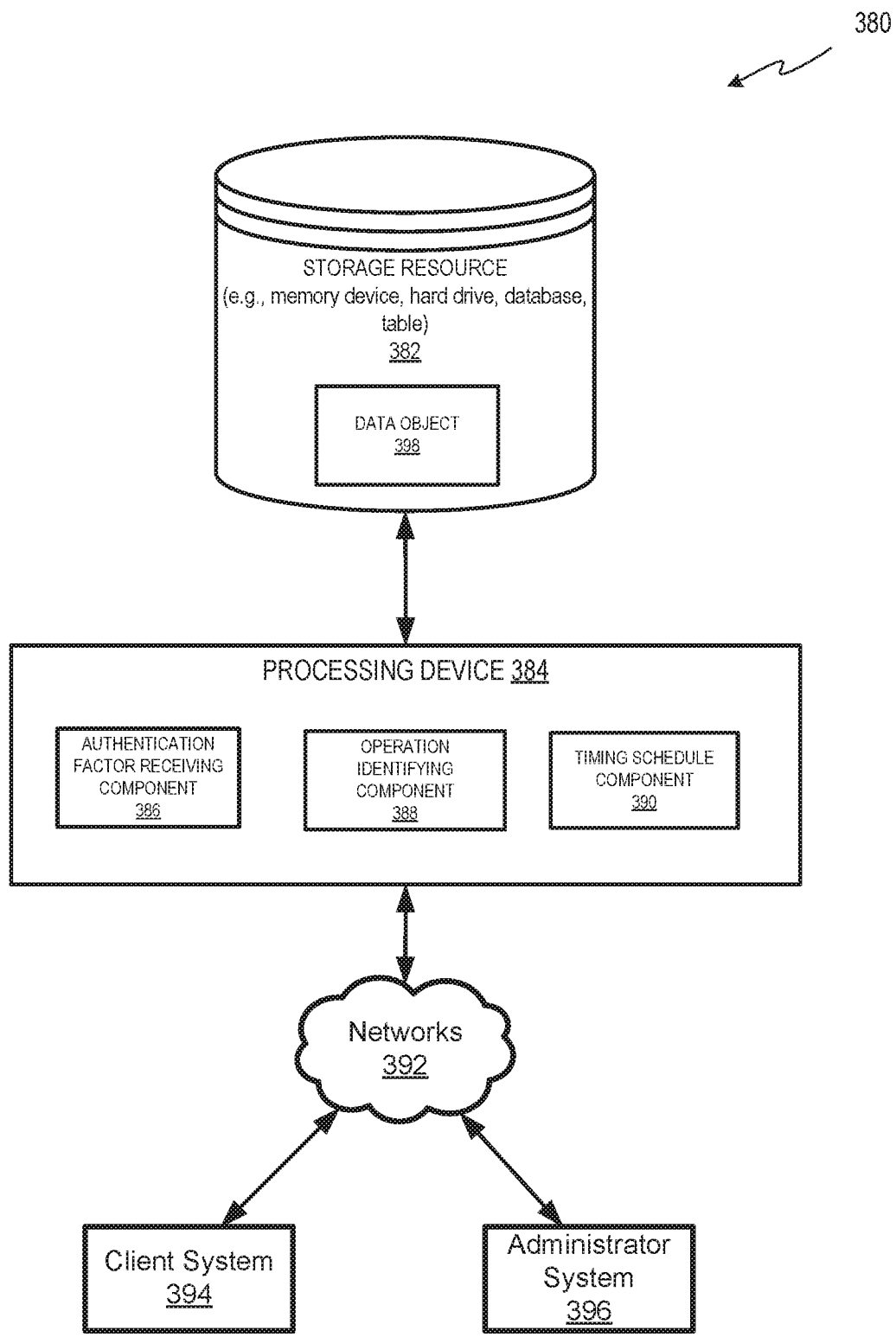
FIG. 3B illustrates an example apparatus in which implementations of the disclosure may operate in accordance with one or more aspects of the present disclosure.

FIG. 3B illustrates an example apparatus 380 in which implementations of the disclosure may operate. The apparatus 380 may be the same or similar to one of the distributed computing system, a network, or other computing devices. The storage resource 382 may include any non-persistent data storage (e.g., memory), persistent data storage (e.g., flash storage, hard drive, tape), another medium, or combination thereof that is capable of storing instructions for carrying out the operations of the components and module discussed herein. Furthermore, the storage resource 382 may store information, such as data object 398. The processing device 384 may be communicatively coupled to a client system 394 and an administrator system 396 via a network 392. The client system 394, the administrator system 396 and the network 392 may correspond to client system 120, administrator system 130 and network 140 of FIG. 1, respectively.

The apparatus 380 may include a processing device 384. The processing device 384 may include an authentication factor receiving component 386, an operation identifying component 388, and a timing schedule component 390.

The authentication factor receiving component 386 may receive the first authentication factor from a client system 394 and, in response, grant permissions to the client system 394. The authentication factor receiving component 386 may also receive the second authentication factor from a client system 394 and/or administrator system 396. The operation identifying component 388 may identify an operation that is requested by client system 394 to be performed on data object 398. The timing schedule component 390 may identify a timing schedule that is associated with the second authentication factor. The timing schedule component 390 may also determine if a response including the second authentication factor is received in view of the timing schedule.

Figure 4A:
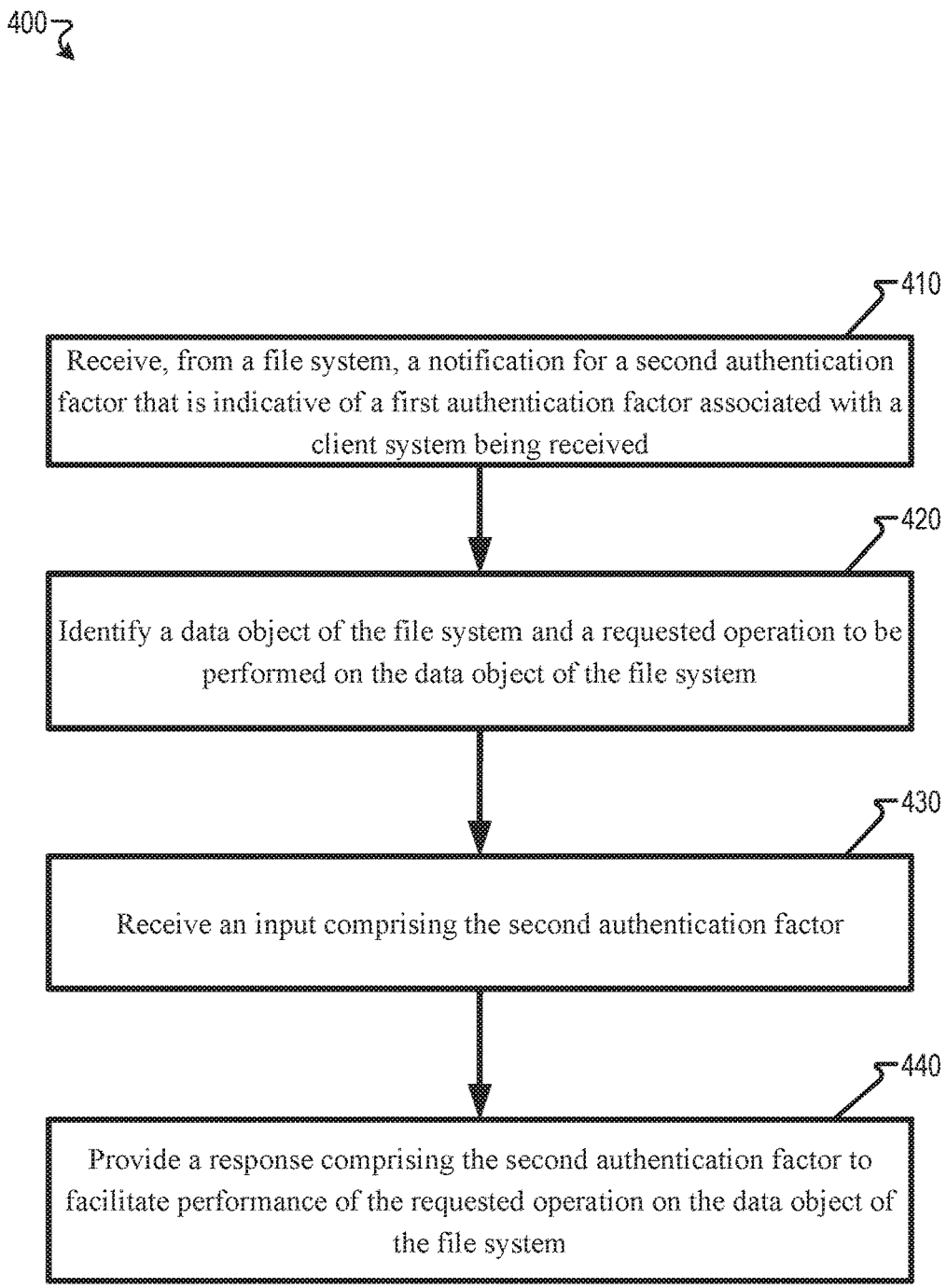
FIG. 4A depicts a flow diagram of an example method to receive a notification from a file system and provide a response including a second authentication factor in accordance with one or more aspects of the present disclosure.

FIG. 4A depicts a flow diagram of an example method 400 to receive a notification from a file system and provide a response including a second authentication factor. The method 400 may be performed by a processing device that may include hardware (e.g., processing logic, circuitry, dedicated logic, programmable logic, microcode, etc.), software (e.g., instructions run or executed on a processing device), or a combination thereof. In general, the method 400 may be performed by the client system 120 and/or the administrator system 130 of FIG. 1.

Method 400 may begin with a processing device receiving, from a file system, a notification for a second authentication factor that is indicative of a first authentication factor associated with a client system being received (block 410). In one implementation, the first authentication factor may correspond to an account authentication of a client system that has been provided to the file system. For example, the notification may include the account authentication information of the client system that the client system provided to the file system. In some implementations, the notification may include a prompt to provide the second authentication factor. In other implementations, the notification may be an email, short message service (SMS) text or a graphical user interface (GUI) box. In further implementations, the notification may include an amount of time until a timeout of an operation. For example, the notification may indicate that the second authentication factor is to be provided within one hour or the operation may timeout. In another implementation, the notification may also include a user associated with a client system. For example, the notification may include a user name or profile associated with the client system. In implementations, the notification may identify an owner group that is associated with the data object of the file system. For example, the notification may indicate that the data object belongs to group A. The owner group may be an entity (e.g., a system administrator) that has been assigned to monitor and/or manage the data object.

The processing device may identify a data object of the file system and a requested operation to be performed on the data object of the file system (block 420). In one implementation, the requested operation may be received by the file system from the client system. In some implementations, the data object and requested operation may be indicated by the notification received at block 410. For example, the processing device may identify that a delete operation is to be performed on a data object of the file system in view of the notification received at block 410. Subsequently, the processing device may receive an input that includes the second authentication factor (block 430). In some implementations, the input may be a selection of a prompt provided by the notification at block 410. For example, the input may be the selection of a selectable icon displayed in the notification.

In response to receiving the input that includes the second authentication factor, the processing device may provide a response that includes the second authentication factor (block 440). The response may facilitate performance of the requested operation on the data object of the file system that was identified at block 420. For example, once the response that includes the second authentication factor is provided to the file system, it may facilitate the file system performing the delete operation on the data object.

Figure 4B:
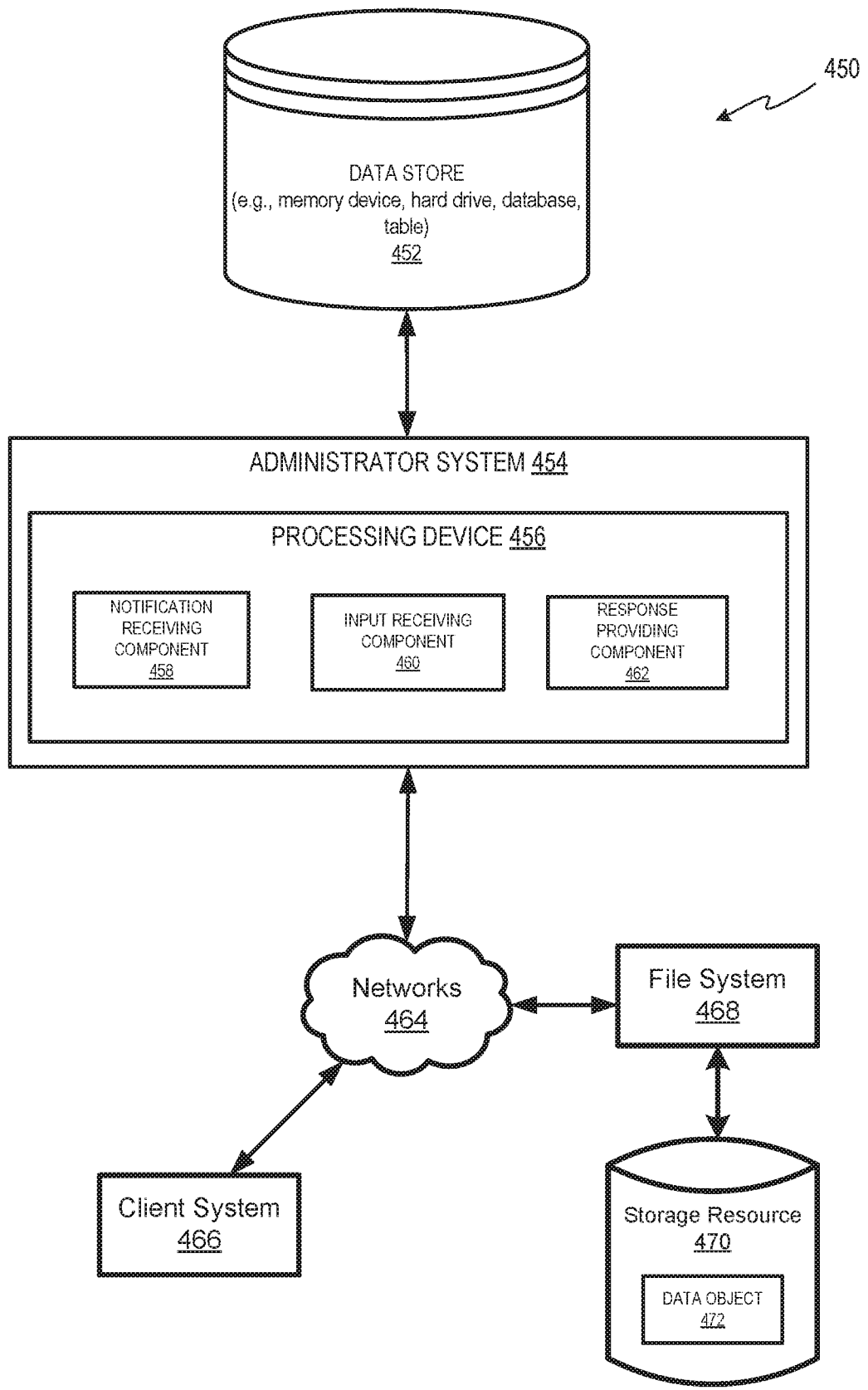
FIG. 4B illustrates an example apparatus in which implementations of the disclosure may operate in accordance with one or more aspects of the present disclosure.

FIG. 4B illustrates an example apparatus 450 in which implementations of the disclosure may operate. The apparatus 450 may be the same or similar to one of the distributed computing system, a network, or other computing devices. The data store 452 may include any non-persistent data storage (e.g., memory), persistent data storage (e.g., flash storage, hard drive, tape), another medium, or combination thereof that is capable of storing instructions for carrying out the operations of the components and module discussed herein. Furthermore, the data store 452 may store information. The administrator system 454 may include a processing device 456 may be communicatively coupled to a client system 466 and a file system 468 via a network 464. The file system 468 may be communicatively coupled to a storage resource 470 that includes data object 472. The client system 466, administrator system 454, file system 468 and the network 464 may correspond to client system 120, administrator system 130, file system 110 and network 140 of FIG. 1, respectively.

The apparatus 450 may include a processing device 456. The processing device 456 may include a notification receiving component 458, an input receiving component 460, and a response providing component 462.

The notification receiving component 458 may receive a notification from file system 468. The notification receiving component 458 may also identify an operation to be performed on data object 472 in view of the received notification. The input receiving component 460 may receive an input that includes the second authentication factor. The response providing component 462 may provide a response to the notification to the file system 468 that includes the second authentication factor.

Figure 5A:
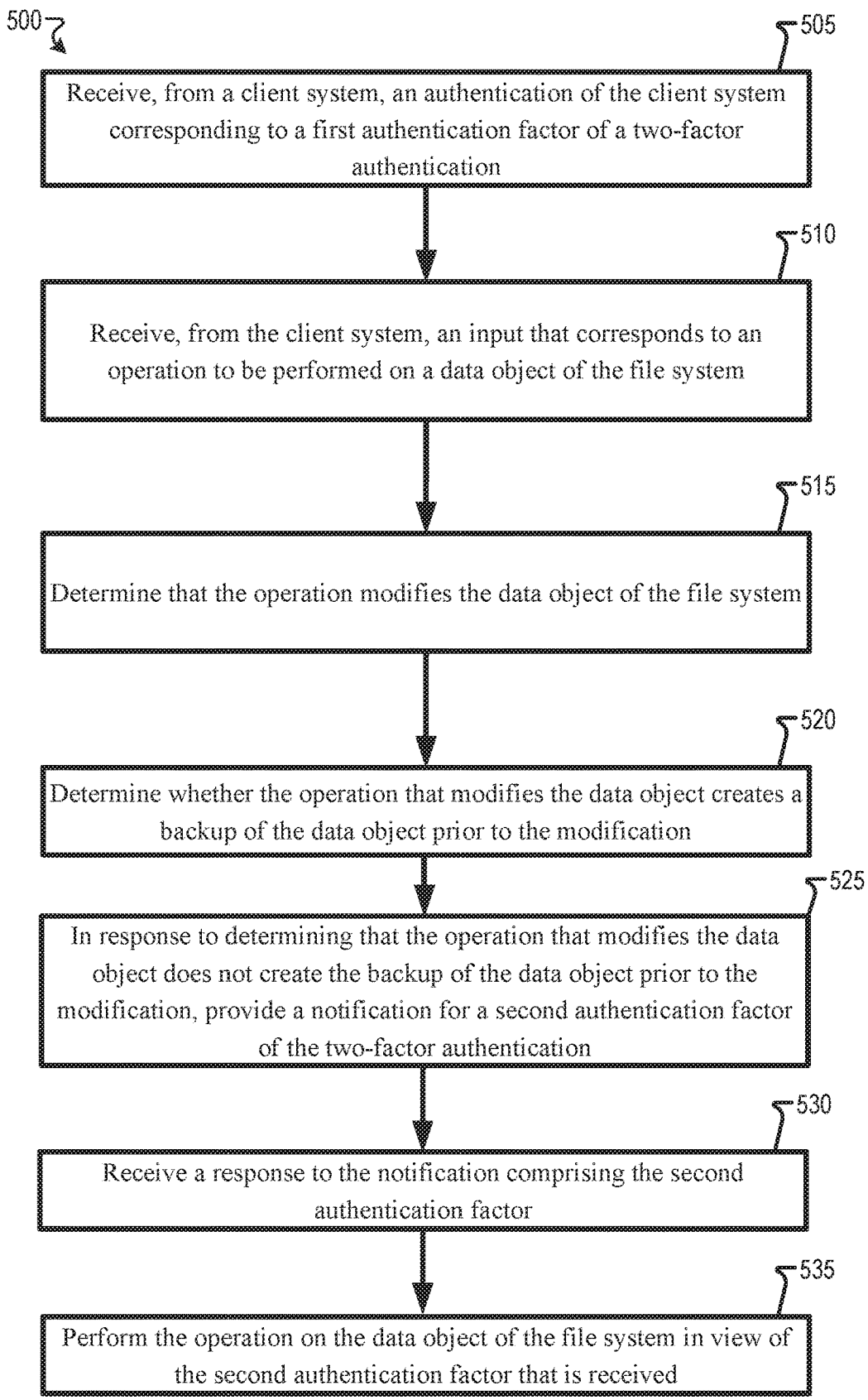
FIG. 5A depicts a flow diagram of an example method to secure a second authentication factor in view determining an operation modifies a data object in accordance with one or more aspects of the present disclosure.

FIG. 5A depicts a flow diagram of an example method 500 to secure a second authentication factor in view determining an operation modifies a data object. The method 500 may be performed by a processing device that may include hardware (e.g., processing logic, circuitry, dedicated logic, programmable logic, microcode, etc.), software (e.g., instructions run or executed on a processing device), or a combination thereof. In general, the method 500 may be performed by the two-factor authentication component 112 of FIG. 1.

Method 500 may begin with a processing device of a file system receiving an authentication of a client system that corresponds to a first authentication factor for a two-factor authentication (block 505). In one implementation, the first authentication factor may correspond to an account authentication of the client system. For example, the first authentication factor may be a username and password for the client system. Upon receiving the first authentication factor, the file system may grant the client system permissions associated with the file system. After granting access, the processing device may receive, from the client system, an input that corresponds to an operation that is to be performed on a data object of the file system (block 510). For example, the processing device may receive an input from the client system and identify that it corresponds to an instruction to delete a data object of the file system.

Subsequently, the processing device may determine whether the operation modifies the data object of the file system (block 515). Examples of operations that modify the data object may include delete operations, overwrite operations, rename operations or the like. An operation that modifies the data object may change contents of the data object. For example, the processing device may determine that the received input that corresponds to an instruction to delete the data object is an operation that modifies the data object of the file system. The processing device may then determine whether the operation that modifies the data object creates a backup of the data object prior to the modification (block 520). For example, prior to performing a delete operation on the data object, the processing device may create a backup (e.g., a copy) of the data object. In some implementations, the backup of the data object may restore the data object after the modifying operation in response to receiving a request. For example, the processing device may receive a request from an administrator system to restore the data object after the delete operation has been performed. Accordingly, the processing device may copy the backup of the data object and restore the data object to its original location.

In response to determining that the operation that modifies the data object does not create a backup of the data object prior to the modification, the processing device may provide a notification for a second authentication factor of the two-factor authentication (block 525). For example, after querying a storage resource for operations that modify the data object, the processing device may determine that a delete operation modifies the data object and does not create a backup prior to the delete operation being performed. Then, the processing device may provide a notification for the second authentication factor of the two-factor authentication. In one implementation, the processing device may determine a computing device that is associated with an administrator of the file system that includes the data object by querying a directory. Then, the processing device may provide the notification to the computing device that is associated with the administrator of the file system. In one implementation, the second authentication factor may be a TOTP password that is generated by the processing device in view of a shared key and the time the second authentication factor is generated. In another implementation, the notification may include a prompt to provide the second authentication factor and an identification of the operation and the data object. In some implementations, the notification for the second authentication factor may not be provided when the operation that modifies the data object results in a backup of the data object. For example, the operation may be performed without receiving the second authentication factor when a backup of the data object will be saved.

After providing the notification, the processing device may receive a response that includes the second authentication factor (block 530). Once the second authentication factor has been received, the processing device may perform the operation on the data object of the file system in view of the second authentication factor that is received (block 535). For example, the processing device may perform a delete operation on the data object.

In some implementations, the processing device may identify a timing schedule that corresponds to an amount of time that elapses before a timeout of the operation. For example, if the timing schedule indicates that 5 minutes may elapse before a timeout of the operation, then if the second authentication factor is not received by the processing device within 5 minutes then the operation will timeout (e.g., the operation will not be performed). In some implementations, different operations may have different timing schedules. For example, a delete operation may have a timing schedule that indicates that 5 minutes may elapse before timeout of the operation, while a rename operation may have a timing schedule that indicates that 10 minutes may elapse before timeout of the operation.

In one implementation, the processing device may receive a second input that corresponds to a second operation to be performed on the data object of the file system. The processing device may then determine that the second operation does not modify the data object of the file system. In response to determining the second operation does not modify the data object, the processing device may perform the second operation on the data object without receiving a respective second authentication factor. For example, the processing device may receive an input that corresponds to performing a copy operation on the data object. Then, the processing device may query a storage resource and determine that a copy operation is not an operation that modifies the data object. Accordingly, the processing device may perform the copy operation on the data object of the file system without receiving a respective second authentication factor.

In another implementation, the processing device may determine whether the second operation is one of a set of operations associated with a second authentication factor. For example, the processing device may query a storage resource for a set of operations that are associated with the second authentication factor. Then, in response to determining that the second operation is not one of a set of operations that are associated with the second authentication factor, the processing device may perform the second operation. For example, after the processing device has determined a copy operation is not one of a set of operations that are associated with the second authentication factor, the processing device may perform the copy operation.

Figure 5B:
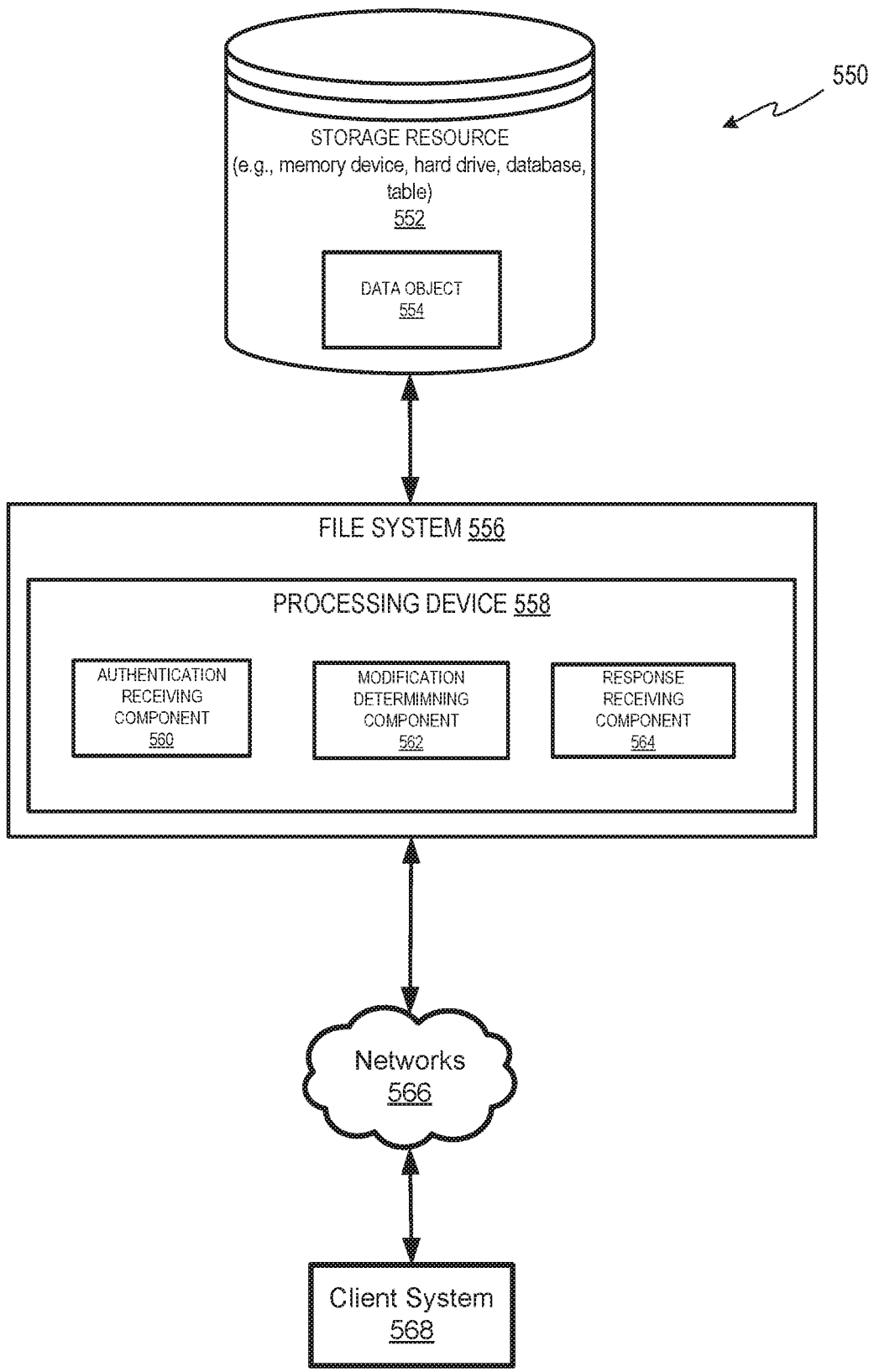
FIG. 5B illustrates an example apparatus in which implementations of the disclosure may operate in accordance with one or more aspects of the present disclosure.

FIG. 5B illustrates an example apparatus 550 in which implementations of the disclosure may operate. The apparatus 550 may be the same or similar to one of the distributed computing system, a network, or other computing devices. The storage resource 552 may include any non-persistent data storage (e.g., memory), persistent data storage (e.g., flash storage, hard drive, tape), another medium, or combination thereof that is capable of storing instructions for carrying out the operations of the components and module discussed herein. Furthermore, the storage resource 552 may store information, such as data object 554. The file system 556 may include a processing device 558 and may be communicatively coupled to a client system 568 via a network 566. The client system 568, file system 556 and the network 566 may correspond to client system 120, file system 110 and network 140 of FIG. 1, respectively.

The apparatus 550 may include a processing device 558. The processing device 558 may include an authentication receiving component 560, a modification determining component 562, and a response receiving component 564.

The authentication receiving component 560 may receive the first authentication factor from a client system 568 and, in response, grant permissions to the client system. The authentication receiving component 560 may also receive the second authentication factor from a client system 568 and/or administrator system. The modification determining component 562 may determine that an operation that is requested by client system 568 to be performed on data object 554 modified the data object. The modification determining component 562 may also determine whether a backup of the data object 554 is created prior to the performance of the modification operation. The response receiving component 564 may receive a response from a client system 568 and/or administrator system that includes a second authentication factor.

Figure 6A:
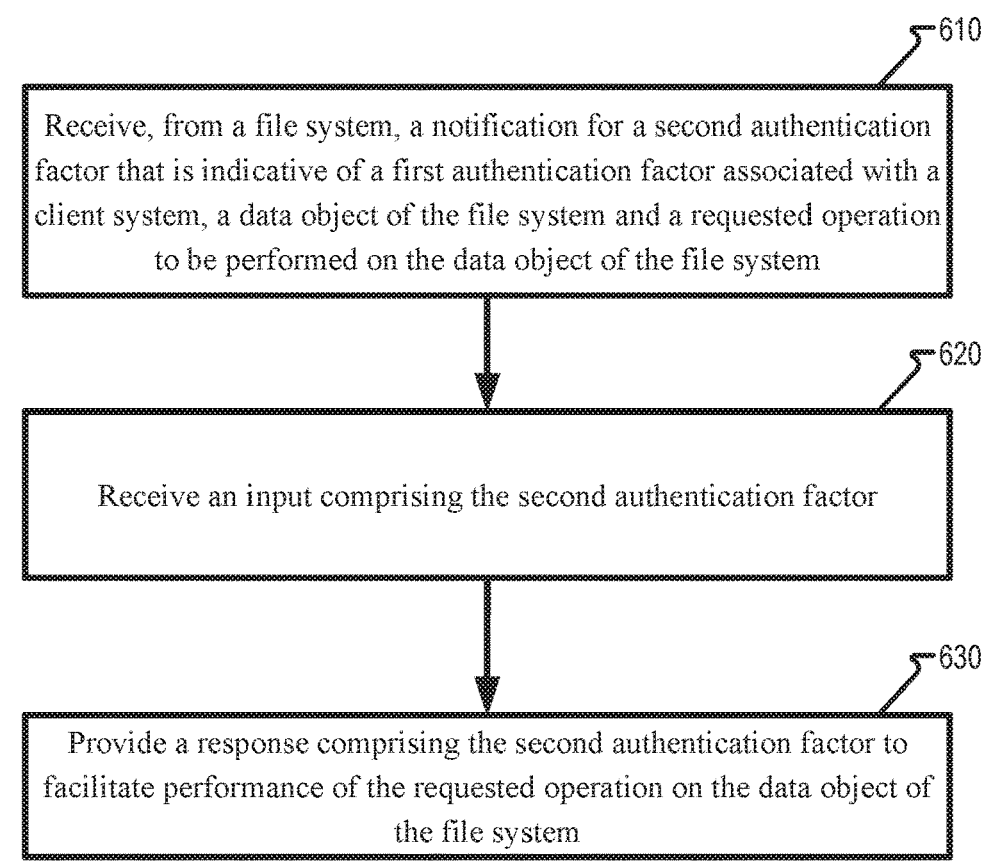
FIG. 6A depicts a flow diagram of an example method to receive a notification from a file system and provide a response including a second authentication factor in accordance with one or more aspects of the present disclosure.

FIG. 6A depicts a flow diagram of an example method 600 to receive a notification from a file system and provide a response including a second authentication factor. The method 600 may be performed by a processing device that may include hardware (e.g., processing logic, circuitry, dedicated logic, programmable logic, microcode, etc.), software (e.g., instructions run or executed on a processing device), or a combination thereof. In general, the method 600 may be performed by the client system 120 and/or the administrator system 130 of FIG. 1.

Method 600 may begin with a processing device receiving, from a file system, a notification for a second authentication factor that is indicative of a first authentication factor associated with a client system, a data object of the file system and a requested operation to be performed on the data object of the file system (block 610). In one implementation, the first authentication factor may correspond to an account authentication of a client system that has been provided to the file system. For example, the notification may include the account authentication information of the client system that the client system provided to the file system. In some implementations, the notification may include a prompt to provide the second authentication factor. In further implementations, the notification may include an amount of time until a timeout of an operation. For example, the notification may indicate that the second authentication factor is to be provided within one hour or the operation may timeout. In another implementation, the notification may also include a user associated with a client system. For example, the notification may include a user name or profile associated with the client system. In implementations, the notification may identify an owner group that is associated with the data object of the file system. For example, the notification may indicate that the data object belongs to the group A.

Subsequently, the processing device may receive an input that includes the second authentication factor (block 620). In some implementations, the input may be a selection of a prompt provided by the notification at block 610. For example, the input may be the selection of a selectable icon displayed in the notification. In response to receiving the input that includes the second authentication factor, the processing device may provide a response that includes the second authentication factor (block 630). The response may facilitate performance of the requested operation of block 610 on the data object of the file system. For example, once the response that includes the second authentication factor is provided to the file system, it may facilitate the file system performing the delete operation on the data object.

Figure 6B:
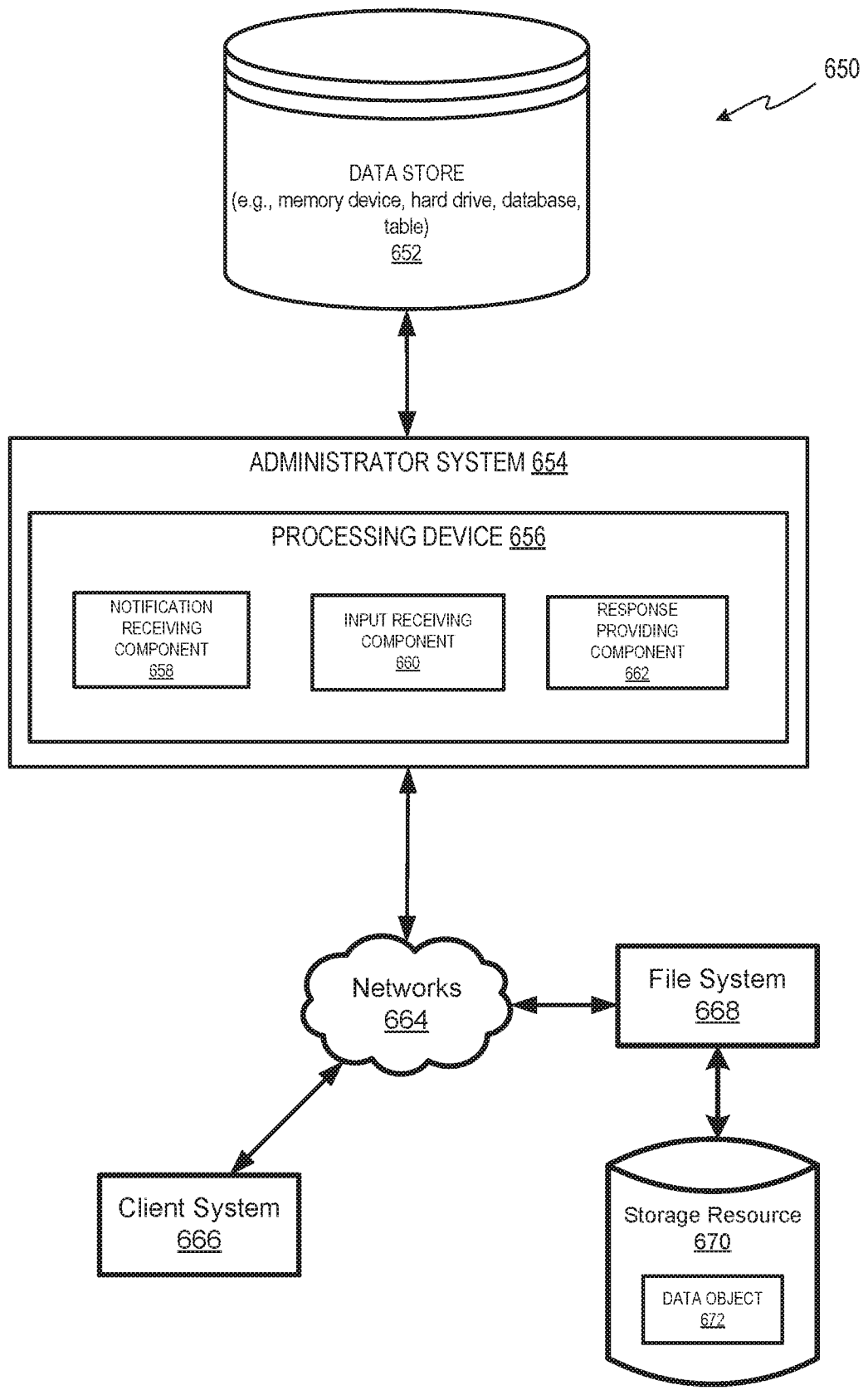
FIG. 6B illustrates an example apparatus in which implementations of the disclosure may operate in accordance with one or more aspects of the present disclosure.

FIG. 6B illustrates an example apparatus 650 in which implementations of the disclosure may operate. The apparatus 650 may be the same or similar to one of the distributed computing system, a network, or other computing devices. The data store 652 may include any non-persistent data storage (e.g., memory), persistent data storage (e.g., flash storage, hard drive, tape), another medium, or combination thereof that is capable of storing instructions for carrying out the operations of the components and module discussed herein. Furthermore, the data store 652 may store information. The administrator system 654 may include a processing device 656 may be communicatively coupled to a client system 666 and a file system 668 via a network 664. The file system 668 may be communicatively coupled to a storage resource 670 that includes data object 672. The client system 666, administrator system 654, file system 668 and the network 664 may correspond to client system 120, administrator system 130, file system 110 and network 140 of FIG. 1, respectively.

The apparatus 650 may include a processing device 656. The processing device 656 may include a notification receiving component 658, an input receiving component 660, and a response providing component 662.

The notification receiving component 658 may receive a notification from file system 668. The notification receiving component 658 may also identify an operation to be performed on data object 672 in view of the received notification. The input receiving component 660 may receive an input that includes the second authentication factor. The response providing component 662 may provide a response to the notification to the file system 668 that includes the second authentication factor.

Figure 7:
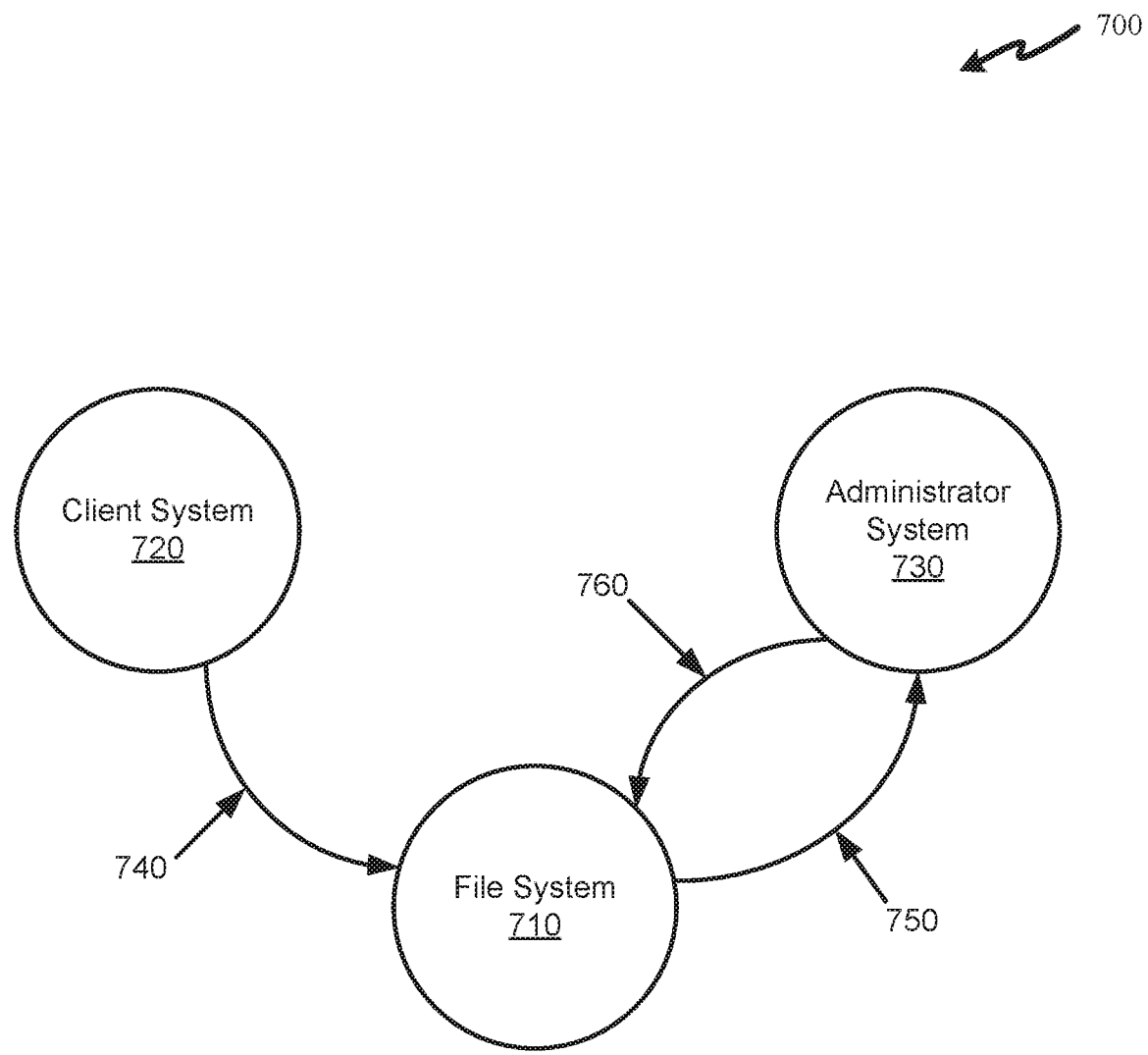
FIG. 7 is an illustration of securing a second authentication factor in response to receiving an input corresponding to an operation being associated with a second authentication factor, according to implementations.

FIG. 7 is an illustration 700 of securing a second authentication factor in response to receiving an input corresponding to an operation being associated with a second authentication factor, according to implementations. File system 710, client system 720 and administrator system 730 may be representative of file system 110, client system 120 and administrator system 130 of FIG. 1, respectively. The client system 720 may provide a first authentication factor 740 that is associated with the client system 720. Once the file system 710 has granted permissions to client system 720, client system 720 may provide an input to file system 710 that corresponds to an operation to be performed on a data object of file system 710. Once the input has been received by the file system 710, the file system 710 may determine whether the operation is one of a set of operations that are associated with a second authentication factor. In response to the file system 710 determining that the operation is associated with a second authentication factor, the file system may generate a notification that includes the second authentication factor.

The file system 710 may provide the notification 750 that includes the second authentication factor to the administrator system 730. The notification may include a prompt to the administrator system 730 to provide the second authentication factor to the file system 710. In some implementations, the file system may provide the notification to the administrator system 730 and/or the client system 720. Subsequent to the administrator system 730 receiving the response, the administrator system 730 may provide a response 760 including the second authentication factor to the file system 710. In some implementations, when the file system 710 receives the second authentication factor from the administrator system 730, the file system 710 may determine whether the second authentication factor was received in accordance with a timing schedule. Once the file system 710 has secured the second authentication factor, the file system 710 may perform the operation on the data object that corresponds to the input received from the client system 720.

Figure 8:
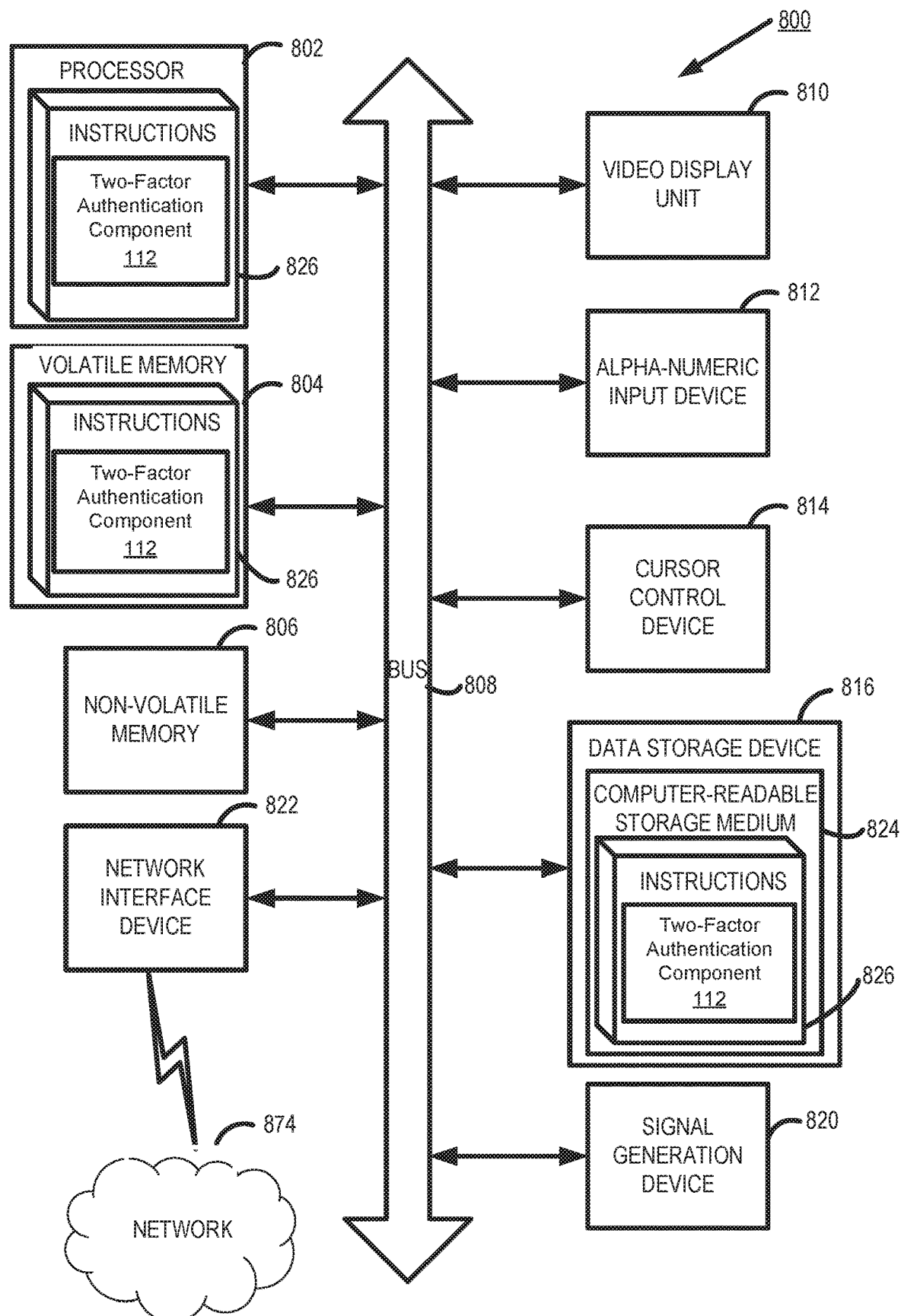
FIG. 8 depicts a block diagram of a computing system operating in accordance with one or more aspects of the present disclosure.

FIG. 8 depicts a block diagram of a computer system operating in accordance with one or more aspects of the present disclosure. In various illustrative examples, computer system 800 may correspond to a computing device within system architecture 100 of FIG. 1. The computer system 800 may host the file system 110.

In certain implementations, computer system 800 may be connected (e.g., via a network, such as a Local Area Network (LAN), an intranet, an extranet, or the Internet) to other computer systems (e.g., client system 120 and administrator system 130). Computer system 800 may operate in the capacity of a server or a client computer in a client-server environment, or as a peer computer in a peer-to-peer or distributed network environment. Computer system 800 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 800 may include a processing device 802, a volatile memory 804 (e.g., random access memory (RAM)), a non-volatile memory 806 (e.g., read-only memory (ROM) or electrically-erasable programmable ROM (EEPROM)), and a data storage device 816, which may communicate with each other via a bus 808.

Processing device 802 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 800 may further include a network interface device 822. Computer system 800 also may include a video display unit 810 (e.g., an LCD), an alphanumeric input device 812 (e.g., a keyboard), a cursor control device 814 (e.g., a mouse), and a signal generation device 820.

Data storage device 816 may include a non-transitory computer-readable storage medium 824 on which may store instructions 826 encoding any one or more of the methods or functions described herein, including instructions encoding the two-factor authentication component 112 of FIG. 1 for implementing methods 200 or 300.

Instructions 826 may also reside, completely or partially, within volatile memory 804 and/or within processing device 802 during execution thereof by computer system 800, hence, volatile memory 804 and processing device 802 may also constitute machine-readable storage media.

While computer-readable storage medium 824 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "receiving," "associating," "deleting," "initiating," "marking," "generating," "recovering," "completing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 200, 300, 400, 500, 600 and/or each of their individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

Example 1 is a method comprising: receiving a first authentication factor associated with a client system; receiving an input, from the client system, corresponding to an operation to be performed on a data object; determining, by a processing device, whether the operation is one of a set of operations being associated with a second authentication factor; in response to determining that the operation is one of the set of operations being associated with the second authentication factor, generating, by the processing device, a notification for the second authentication factor; receiving a response comprising the second authentication factor; and performing the operation in view of the second authentication factor.

Example 2 is the method of Example 1, wherein receiving the response comprising the second authentication factor comprises: identifying a timing schedule that corresponds to an amount of time that elapses before a timeout of the operation; and determining that the response comprising the second authentication factor has been received within the amount of time.

Example 3 is the method of Example 1, wherein a first operation of the set of operations is assigned a first timing schedule that corresponds to a first amount of time that elapses before a timeout of the first operation, and wherein a second operation of the set of operations is assigned a second timing schedule that corresponds to a second amount of time that elapses before the timeout of the second operation.

Example 4 is the method of Example 1, wherein the set of operations being associated with a second authentication factor comprises operations that are not performed until the second authentication factor has been received.

Example 5 is the method of Example 1, further comprising: transmitting the notification comprising a prompt to provide the second authentication factor and an identification of the operation and the data object.

Example 6 is the method of Example 1, wherein the first authentication factor corresponds to an account authentication of the client system, and wherein the second authentication factor corresponds to an approval to perform the operation from an administrator of a file system comprising the data object.

Example 7 is the method of Example 1, further comprising: receiving a second input, from the client system, corresponding to a second operation to be performed on the data object; determining whether the second operation is one of the set of operations being associated with the second authentication factor; and in response to determining that the operation is not one of the set of operations being associated with the second authentication factor, performing the second operation without receiving a corresponding second authentication factor.

Example 8 is the method of Example 1, further comprising: determining a computing device associated with an administrator of a file system comprising the data object; and providing the notification to the computing device associated with the administrator of the file system.

Example 9 is the method of Example 1, further comprising: generating a time-based one-time password in view of a shared key and a time the notification is generated for the second authentication factor.

Example 10 is a non-transitory computer readable storage medium having instructions that, when executed by a processing device, cause the processing device to: receive an indication of a client system satisfying a first authentication factor; identify an operation requested by the client system to be performed on a data object of a file system; determine whether the operation is one of a set of operations being associated with a second authentication factor; in response to determining that the operation is one of the set of operations being associated with the second authentication factor, provide, to an administrator system, a notification for the second authentication factor; receive, from the administrator system, a response comprising the second authentication factor; determine whether the response was received in view of a timing schedule; and in response to determining the response was received in view of the timing schedule, perform the operation on the data object.

Example 11 is the non-transitory computer readable storage medium of Example 10, wherein the timing schedule corresponds to a type of operation to be performed on the data object.

Example 12 is the non-transitory computer readable storage medium of Example 10, wherein the processing device is further to: generate a time-based one-time password in view of a shared key and a time the notification is provided for the second authentication factor.

Example 13 is the non-transitory computer readable storage medium of Example 10, wherein the first authentication factor corresponds to an account authentication of the client system, and wherein the second authentication factor corresponds to an approval to perform the operation from an administrator of a file system comprising the data object.

Example 14 is the non-transitory computer readable storage medium of Example 10, wherein the processing device is further to: identify a second operation requested by the client to be performed on the data object of the file system; determine whether the second operation is one of the set of operations requiring the second authentication factor; and in response to determining the operation is not one of the set of operations requiring the second authentication factor, perform the second operation without receiving a corresponding second authentication factor.

Example 15 is the non-transitory computer readable storage medium of Example 10, wherein the processing device is further to: determine a computing device associated with an administrator of a file system comprising the data object; and provide the notification to the computing device associated with the administrator of the file system.

Example 16 is the non-transitory computer readable storage medium of Example 10, wherein the timing schedule corresponds to an amount of time that elapses before a timeout of the operation.

Example 17 is a system comprising: a memory; and a processing device, operatively coupled to the memory, to: receive, from a file system, a notification for a second authentication factor that is indicative of a first authentication factor associated with a client system being received; identify a data object of the file system and a requested operation to be performed on the data object of the file system, wherein the requested operation is from the client system; receive an input comprising the second authentication factor; and provide a response comprising the second authentication factor to facilitate performance of the requested operation on the data object of the file system.

Example 18 is the system of Example 17, wherein the receiving of the input comprising the second authentication factor comprises: receiving a selection of a prompt provided by the notification to provide the second authentication factor.

Example 19 is the system of Example 17, wherein the receiving the notification for the second authentication factor comprises: receiving an indication of an amount of time until a timeout of the requested operation to be performed on the data object of the file system.

Example 20 is the system of Example 17, wherein the notification comprises a user associated with the client system.

Example 21 is the system of Example 17, wherein the first authentication factor corresponds to an account authentication of the client system, and wherein the second authentication factor corresponds to an approval to perform the operation from an administrator of a file system comprising the data object.

Example 22 is the system of Example 17, wherein the notification comprises at least one of an email, a short message service (SMS) text or a graphical user interface (GUI) box.

Example 23 is the system of Example 17, wherein the notification identifies the data object of the file system the requested operation is to be performed on.

Example 24 is the system of Example 17, wherein the notification identifies an owner group associated with the data object of the file system.

Example 25 is a system comprising: a file system; a processing device, operatively coupled with the file system, to: receive, from a client system, an authentication of the client system corresponding to a first authentication factor of a two-factor authentication; receive, from the client system, an input that corresponds to an operation to be performed on a data object of the file system; determine that the operation modifies the data object of the file system; determine whether the operation that modifies the data object creates a backup of the data object prior to the modification; in response to determining that the operation that modifies the data object does not create the backup of the data object prior to the modification, provide a notification for a second authentication factor of the two-factor authentication; receive a response to the notification comprising the second authentication factor; and perform the operation on the data object of the file system in view of the second authentication factor that is received.

Example 26 is the system of Example 25, further comprising: receive, from the client system, a second input that corresponds to a second operation to be performed on the data object of the file system; determine that the second operation does not modify the data object of the file system; and perform the second operation on the data object of the file system without receiving a respective second authentication factor.

Example 27 is the system of Example 26, wherein the processing device is further to: determine whether the second operation is one of a set of operations associated with the second authentication factor, wherein performing the second operation on the data object is in response to determining the second operation is not one of a set of operations associated with the second authentication factor.

Example 28 is the system of Example 25, wherein the operation that modifies the data object comprises one of a delete operation or an overwrite operation.

Example 29 is the system of Example 25, wherein the backup of the data object can restore the data object after the modifying operation in response to receiving a request.

Example 30 is the system of Example 25, wherein the first authentication factor corresponds to an account authentication of the client system, and wherein the second authentication factor corresponds to an approval to perform the operation from an administrator of a file system comprising the data object.

Example 31 is the system of Example 25, wherein receiving the response comprising the second authentication factor comprises: identifying a timing schedule that corresponds to an amount of time that elapses before a timeout of the operation; and determining that the response comprising the second authentication factor has been received within the amount of time.

Example 32 is the system of Example 25, wherein the processing device is further to: determine a computing device associated with an administrator of the file system comprising the data object; and provide the notification to the computing device associated with the administrator of the file system.

Example 33 is the system of Example 25, wherein the processing device is further to: generate the notification comprising a time-based one-time password in view of a shared key and a time the notification is generated for the second authentication factor.

Example 34 is the system of Example 25, wherein the notification comprises a prompt to provide the second authentication factor and an identification of the operation and the data object.

Example 35 is an apparatus comprising: a processing device; means for receiving, from a file system, a notification for a second authentication factor that is indicative of a first authentication factor associated with a client system, a data object of the file system and a requested operation to be performed on the data object of the file system; means for receiving an input comprising the second authentication factor; and means for providing a response comprising the second authentication factor to facilitate performance of the requested operation on the data object of the file system.

Example 36 is the apparatus of Example 35, wherein the receiving the input comprising the second authentication factor comprises: selecting a prompt provided by the notification to provide the second authentication factor.

Example 37 is the apparatus of Example 35, wherein the receiving the notification for the second authentication factor comprises: receiving an amount of time until a timeout of the operation to be performed on the data object of the file system.

Example 38 is the apparatus of Example 35, wherein the first authentication factor corresponds to an account authentication of the client system, and wherein the second authentication factor corresponds to an approval to perform the operation from an administrator of a file system comprising the data object.

Example 39 is the apparatus of Example 35, wherein the notification identifies an owner group associated with the data object of the file system.

Example 40 is the apparatus of Example 35, wherein the notification comprises a user associated with the client system.

What is claimed is:

1. A method comprising:
   receiving, by a file system via a network, a first authentication factor associated with a client system;
   receiving, by the file system via the network, an input, from the client system, corresponding to an operation to be performed on a data object of the file system;
   determining, by the file system, whether the operation is one of a set of operations that require a predetermined second authentication factor of the client system and in view of the data object, in order to be performed on the data object, wherein the set of operations that require the predetermined second authentication factor of the client system are designated by an administrator system associated with the file system comprising the data object, and wherein the predetermined second authentication factor corresponds to an approval by the administrator system to perform the operation with respect to the data object;
   in response to determining that the operation is one of the set of operations that require the predetermined second authentication factor in view of the data object, generating, by the file system, a notification for the second authentication factor of the client system;
   receiving, by the file system via the network and from the administrator system, a response comprising the predetermined second authentication factor of the client system; and
   responsive to receiving the response comprising the predetermined second authentication factor, performing, by the file system, the operation received from the client system on the data object in view of the predetermined second authentication factor of the client system.

2. The method of claim 1, wherein receiving the response comprising the predetermined second authentication factor comprises:
   identifying a timing schedule that corresponds to an amount of time that elapses before a timeout of the operation; and
   determining that the response comprising the predetermined second authentication factor has been received within the amount of time.

3. The method of claim 1, further comprising:
   transmitting the notification comprising a prompt to provide the predetermined second authentication factor and an identification of the operation and the data object.

4. The method of claim 1, wherein the first authentication factor corresponds to an account authentication of the client system.

5. The method of claim 1, further comprising:
   receiving a second input, from the client system, corresponding to a second operation to be performed on the data object;
   determining whether the second operation is one of the set of operations that require the predetermined second authentication factor in order to be performed; and
   in response to determining that the operation is not one of the set of operations that require the predetermined second authentication factor in order to be performed, performing the second operation without receiving a corresponding second authentication factor.

6. The method of claim 1, further comprising:
   determining a computing device associated with an administrator of the file system comprising the data object; and
   providing the notification to the computing device associated with the administrator of the file system.

7. A non-transitory computer readable storage medium having instructions that, when executed by a processing device, cause the processing device to:
   receive, by a file system via a network, an indication of a client system satisfying a first authentication factor;
   identify, by the file system, an operation requested by the client system to be performed on a data object of the file system;

determine, by the file system, whether the operation is one of a set of operations that require a predetermined second authentication factor of the client system and in view of the data object, in order to be performed on the data object, wherein the set of operations that require the predetermined second authentication factor of the client system are designated by an administrator system associated with the file system comprising the data object, and wherein the predetermined second authentication factor corresponds to an approval by the administrator system to perform the operation with respect to the data object;

in response to determining that the operation is one of the set of operations that require the predetermined second authentication factor in view of the data object, provide, by the file system via the network, to the administrator system, a notification for the predetermined second authentication factor of the client system;

receive, from the administrator system via the network, a response comprising the predetermined second authentication factor of the client system;

determine, by the file system, whether the response was received in view of a timing schedule; and in response to determining the response was received in view of the timing schedule, perform, by the file system, the operation received from the client system on the data object.

8. The non-transitory computer readable storage medium of claim 7, wherein the timing schedule corresponds to a type of operation to be performed on the data object.

9. The non-transitory computer readable storage medium of claim 7, wherein the first authentication factor corresponds to an account authentication of the client system.

10. The non-transitory computer readable storage medium of claim 7, wherein the processing device is further to:
identify a second operation requested by the client to be performed on the data object of the file system;
determine whether the second operation is one of the set of operations requiring the predetermined second authentication factor; and
in response to determining the operation is not one of the set of operations requiring the predetermined second authentication factor, perform the second operation without receiving a corresponding second authentication factor.

11. The non-transitory computer readable storage medium of claim 7, wherein the processing device is further to:
determine a computing device associated with an administrator of the file system comprising the data object; and
provide the notification to the computing device associated with the administrator of the file system.

12. The non-transitory computer readable storage medium of claim 7, wherein the timing schedule corresponds to an amount of time that elapses before a timeout of the operation.

13. A system comprising:
a memory; and
a processing device, operative coupled to the memory, to:
receive, by a file system via a network, a first authentication factor associated with a client system;
receive, by the file system via the network, an input, from the client system, corresponding to an operation to be performed on a data object of the file system;
determine, by the file system, whether the operation is one of a set of operations that require a predetermined second authentication factor of the client system and in view of the data object, in order to be performed on the data object, wherein the set of operations that require the predetermined second authentication factor of the client system are designated by an administrator system associated with the file system comprising the data object, and wherein the predetermined second authentication factor corresponds to an approval by the administrator system to perform the operation with respect to the data object;
in response to determining that the operation is one of the set of operations that require the predetermined second authentication factor in view of the data object, generate, by the file system, a notification for the second authentication factor of the client system;
receive, by the file system via the network from the administrator system, a response comprising the predetermined second authentication factor of the client system; and
responsive to receiving the response comprising the predetermined second authentication factor, perform, by the file system, the operation received from the client system on the data object in view of the predetermined second authentication factor of the client system.

14. The system of claim 13, wherein to receive the response comprising the predetermined second authentication factor, the processing device is further to:
identify a timing schedule that corresponds to an amount of time that elapses before a timeout of the operation; and
determine that the response comprising the predetermined second authentication factor has been received within the amount of time.

15. The system of claim 13, wherein the processing device is further to:
transmit the notification comprising a prompt to provide the predetermined second authentication factor and an identification of the operation and the data object.

16. The system of claim 13, wherein the first authentication factor corresponds to an account authentication of the client system.

17. The system of claim 13, wherein the processing device is further to:
receive a second input, from the client system, corresponding to a second operation to be performed on the data object;
determine whether the second operation is one of the set of operations requiring the predetermined second authentication factor; and
in response to determining the operation is not one of the set of operations requiring the predetermined second authentication factor, perform the second operation without receiving a corresponding second authentication factor.

18. The system of claim 13, wherein the processing device is further to:
determine a computing device associated with an administrator of the file system comprising the data object; and
provide the notification to the computing device associated with the administrator of the file system.

* * * * *